UNITED STATES PATENT OFFICE.

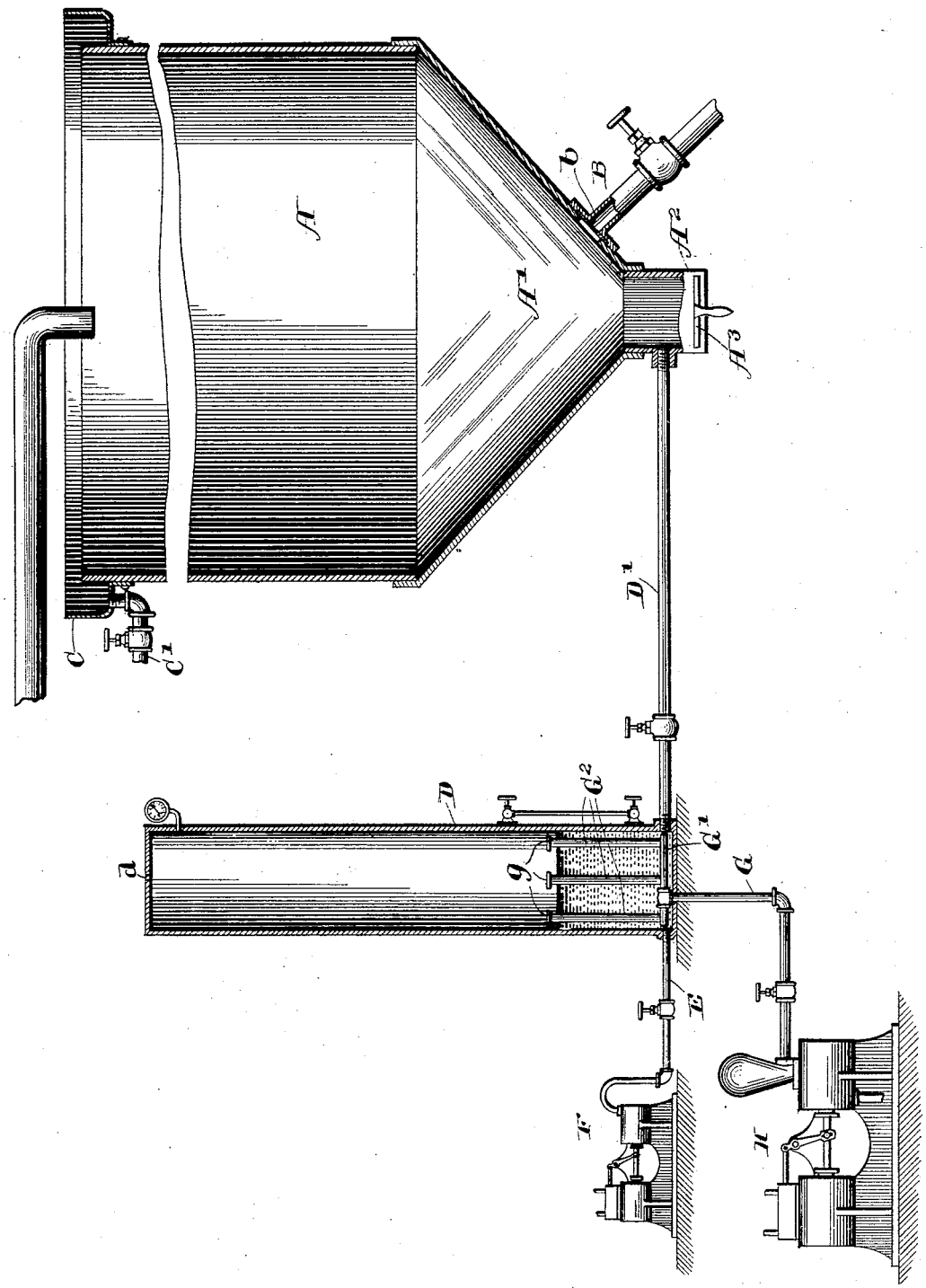

WILLIAM P. RICE, OF CHICAGO, ILLINOIS.

PROCESS OF STEEPING GRAIN.

SPECIFICATION forming part of Letters Patent No. 713,349, dated November 11, 1902.

Application filed April 4, 1902. Serial No. 101,367. (No specimens.)

*To all whom it may concern:*

Be it known that I, WILLIAM P. RICE, of Chicago, in the county of Cook and State of Illinois, have invented certain new and useful Improvements in Processes of Steeping Grain; and I do hereby declare that the following is a full, clear, and exact description thereof, reference being had to the accompanying drawing, and to the letters of reference marked thereon, which forms a part of this specification.

This invention relates to a novel process of steeping grain in a malt-house preparatory to the germinating or growing process on the malt-floor; and the invention consists in the matters hereinafter set forth, and more particularly pointed out in the appended claims.

Among the objects of my invention is to shorten the time necessary for growing the grain on the malt-floor, to prepare the grain so that it may be in a practically uniform state of germination when its growth on the malt-floor is checked, to reduce the loss occasioned by ungerminated corns, to increase the weight of the malt produced from said grain, and to brighten the corns, and thereby increase the value of the product.

In practicing out my novel process I proceed generally as follows: Air is mixed with water in a closed chamber under a pressure greater than that in the tank or vat in which the grain is steeped, and the water is brought into contact with the air in such condition that a volume of air is absorbed by the water practically proportionate to the pressure in the mixing-chamber, said air being retained in absorption so long as the pressure on the water remains the same as that at which the air is taken up thereby. Said chamber is connected by a passage with the steep-tank, so that the air-charged water may be delivered to the body of grain therein and preferably to the lower portion of said body. As the water is discharged from said chamber and enters said passage, and the pressure therefore diminishes, the air is freed in the water in the form of exceedingly minute particles or bubbles, the size of said bubbles being such that when the water charged therewith is delivered to the steep-tank the resistance to their rise is so great and the consequent tendency to escape upwardly through the grain in the steep-tank is so small that said bubbles do not quickly separate from the water, but remain in the body of the same for a considerable time, and are therefore carried by the water to all parts of the mass of grain in the steep-tank uniformly. As a result the beneficial effect of the air upon the individual corns of the mass of grain is uniform, and by reason of the relative stability of the mixture of air and water time is given for the air to act upon the individual corns of the mass. After the water is delivered into the steep-tank and as it rises upwardly through the mass of grain therein the pressure thereon is gradually diminished and the air held in absorption therein is therefore gradually freed until the water reaches the top of the steep-tank and overflows the same, at which time the amount of air contained in the water will be that due to atmospheric pressure.

I have herein shown an approved form of apparatus for carrying out my process and will describe the same by reference to the accompanying drawing, after which I will refer more in detail to the features of novelty of my process and the advantages accruing from steeping grain in accordance with said process.

The figure of the drawing illustrates, partially diagrammatically, said apparatus, showing in vertical section the water and air mixing chamber and an adjacent steep-tank and the connections between said chamber and tank.

As shown in said drawing, A designates a steep-tank of the usual construction, having a tapered lower end A' and provided at the extreme lower end of said tapered portion of the tank with a discharge spout or passage $A^2$, having a sliding valve or gate $A^3$, the opening of which permits the discharge of grain from the tank. Grain is supplied to the steep-tank through the open upper end thereof and steep-water aside from that furnished by the apparatus presently to be described may be supplied to the tank in any preferred manner. Said tank is provided at its lower end adjacent to the grain-discharge passage with a steep-water-discharge pipe B, and a screen $b$ is located between the induction end of said pipe and the interior of the tank. Said pipe B is provided for withdrawing the steep-water from the tank when it is desired to change the water or when the grain has been sufficiently steeped and the water is to be withdrawn preparatory to discharging the grain.

C designates an overflow-trough located around the upper open end of the steep-tank, which receives the overflow-water from the tank, and said trough is provided with a valved discharge-pipe C'.

D designates a closed chamber, which may be termed an "air and water mixing" chamber, and in which the air and water by which the grain is treated in accordance with my process is mixed preparatory to directing the same into and through the steep-tank. E designates an air-pipe which opens into the lower end of said tank, as herein shown, and is connected at its end remote from the tank with a source supplying air under pressure—as, for instance, an air-pump F.

G designates a water-pipe which enters the mixing-chamber through the bottom wall thereof and is connected at its end remote from the chamber with a force-pump H. Said water-pipe terminates at its discharge end into one or more spray-nozzles, through which the water is discharged in sprays or small jets. As herein shown, the pipe is connected inside the tank with a distributing-head G', which latter communicates with a plurality of vertical discharge-pipes $G^2$, provided at their discharge ends with rose or spray nozzles $g$, through which the water is discharged into the interior of the chamber D. The discharge-openings of said spray-nozzles are made so small as to finely subdivide the water issuing therefrom, being desirably in the neighborhood of one-sixteenth of an inch in diameter. The spray from said discharge-nozzles is thrown upwardly against the end wall of the mixing-chamber D and thence is deflected downwardly to the bottom of the chamber, passing twice through the body of compressed air in the chamber, and collects in said bottom of the chamber in a body, whence it is discharged through the pipe D' into the steep-tank.

The operation of the apparatus and the process effected thereby is as follows: Usually the grain will first be steeped in natural water or water containing only a normal amount of air, and thereafter water charged with air in accordance with my process is delivered to the body of the grain. Thereafter the process herein described may be carried on continuously during the remainder of the steeping stage or may be carried on intermittently, if desired.

In carrying out my process air is delivered by the pipe E into the mixing-chamber under suitable pressure to produce the required absorption of air by the water and water is delivered through the pipe G under the necessary pressure to force the same into the mixing-chamber against the pressure therein. The water discharged from the terminal pipes $G^2$ of the water-supply pipe is forced with considerable velocity in the form of a spray or small jets through the body of compressed air in the chamber against the top wall of said chamber and thence falls backwardly again through the body of compressed air to the bottom of the chamber, whence it is delivered through the pipe D' to the steep-tank. The passage of the water in the form of spray or fine jets through the body of compressed air is such as to facilitate or promote an intimate commingling of the water with the air, and the pressure in said tank due to that of the source supplying the air is such as to cause the water to absorb the air, the volume of air absorbed under the favorable conditions existing in the chamber—to wit, the intimate commingling of the air and water—being substantially proportionate to the pressure. I have found in practice that a pressure of forty-five pounds to the square inch is such as to produce an absorption of a volume of air by the water sufficient to produce the desired effect on the grain in the steep-tank when the air-charged water is delivered to said tank; but said pressure may be varied to suit grains of different character, some grains requiring a greater percentage of oxygen than others. The absorption by the water of the oxygen of the air is greater than that of nitrogen, so that when the air is given up by the water, as will hereinafter more fully appear, the oxygen bears a greater proportion to the nitrogen than in normal or typical air. As soon as the water passes from the chamber D to the steep-tank A, and the pressure is therefore diminished, the air in the water is freed, the amount freed being proportionate to the decrease of pressure and other conditions, as the temperature. The air when freed from the water assumes the form of exceedingly minute particles or bubbles, which, as before stated, have so little buoyancy and encounter so great resistance that they do not tend to quickly rise and escape from the body of water in the tank, but remain suspended therein for a relatively long time in the form in which they are freed from the water. Said water uniformly permeates the mass of grain when rising therethrough and the minute particles of the air held in suspension in the water are carried by the water to all parts of the grain alike. The nitrogen constituent of the air is believed to be neutral in its effect on the grain, the oxygen being the active agent or gas which is depended upon to produce the beneficial effect thereon. When the water is delivered into the lower end of the steep-tank, all of the air held in absorption is not at once freed thereby, but a volume of the air is retained in said water, due to the pressure of the superimposed water and grain, and as the water rises gradually upwardly through the tank the pressure becomes gradually less and the gas held in absorption by the water is gradually freed until the top of the tank is reached, at which time the percentage of air held in the water will be that due to atmospheric pressure. In this manner it will be seen that the delivery of the air to the grain in the water is more gradual than if said air were all freed by the water in the form of bubbles or particles at once upon the entrance of said water to the steep-tank. The minute particles of the air are carried in suspension in the water and are given up by the water and cling or adhere to the individual corns of the grain mass. The oxygen of the air so clinging or adhering to the grain is favorable to the normal respiration of the corns, whereby germination may begin and proceed uninterruptedly in the steep-tank. A further effect of the air upon the corns, due to the preponderance of oxygen in the air, is that the corns are bleached or brightened, thereby giving an improved color and appearance to the finished product. The germination of the grain begins in the steep-tank, and the absorption of water is required to effect the beginning of the germination, and the respiration of the corns supplies the necessary oxygen to the germs to promote their growth as soon as germination begins. With my improved process the necessary supply of oxygen is at hand to satisfy such respiratory action of the corns, so that favorable conditions are at once established for starting and maintaining the growth of the germs. Natural water containing only a normal amount of air does not contain the necessary amount of oxygen to so promote germination, and the steeping of grain in water lacking the necessary oxygen is very injurious to the germinating power of the grain, for the reason that the grain becomes wholly or partially drowned therein. In the former case the grain is ruined for further germination, while in the latter case considerable time is required to recuperate the same after transferring the grain from the steep-tank to the malt-floor before visible germination sets in. As a result of my process the amount of oxygen supplied to the grain can be so regulated that a visible growth of grain will manifest itself very soon after the grain is removed from the steep-tank to the malt-floor, and I am, for this reason, enabled to very materially shorten the germinating period of the grain.

A further advantage of the process herein described is that I am enabled to bring all of the corns of the mass of grain in the steep-tank to practically the same stage of germination, so that when the steeped grain is placed on the malt-floor there is not experienced the disadvantage of having a large percentage of overgrown corns and another large percentage of undergrown corns at the time when the germination is checked in order to arrive at an average stage of germination of the entire piece. In other words, by the use of my process I am enabled to check the germination on the malt-floor at a stage when a very large percentage or practically all of the corns are at the proper stage at which the growth of the grain should be checked. In this manner the quality of the malt is greatly improved, as it does not contain a large percentage of undergrown or overgrown corns.

A still further advantage of the process described is that the percentage of ungerminated corns is by the use of my process greatly decreased as compared with prior processes. This is due to the stimulating effect of the oxygen of the air on the germs of the corns while in the steep-tank, which prevents drowning of the said germs beyond recuperation, such as takes place under conditions where there is a deficiency in the supply of oxygen. In this manner, therefore, I am enabled not only to increase the volume of the malt, but also to greatly improve its quality, it being well known that the presence of ungerminated corns in finished malt is deleterious thereto.

A further effect of the oxygen on the grain, when the air is delivered to the steep-tank in the state or condition above described, is that it acts as a bleaching agent to whiten the corns, and thereby improve the color and grade of the malt produced therefrom.

It is obvious that my improved process may be employed for delivering a purely bleaching gas or gaseous mixture to the grain in the steep-tank and that the application of such bleaching-gas will be substantially the same as that of air, as above referred to. It is also evident that the quantity of gas or gaseous mixture used, of whatever nature, is comparatively small, for the reason that the same is so minutely divided that all of the gas or gaseous mixture in the tank is advantageously or economically employed, and for this reason I am enabled to use gases or gaseous mixtures which would otherwise be prohibitive on account of their cost. In the use of other gases or gaseous mixtures the conditions of the process with respect to the pressure will be varied to suit the gas or gaseous mixture used.

The top wall of the mixing-chamber is provided with a vent-opening $d$, through which the excess of nitrogen in the chamber may be discharged therefrom.

It is obvious that the process hereinbefore described is not dependent upon the apparatus illustrated and that such apparatus may be widely varied.

I claim as my invention—

1. The process of steeping grain which consists of the absorption by water of a gas or gaseous mixture at greater than atmospheric pressure, and thereafter reducing the pressure on said water, and passing it through the mass of grain to be steeped.

2. The process of steeping grain which consists of mixing a gas or gaseous mixture with water at a pressure greater than that in which the grain is steeped and under conditions favorable to an intimate commingling thereof, and thereafter passing the charged water through the mass of grain to be steeped.

3. The process of steeping grain which consists of mixing air and water at a pressure greater than that in which the grain is steeped and under conditions favorable to an intimate commingling thereof, and thereafter passing the charged water through the mass of grain to be steeped.

4. The process of steeping grain which consists of mixing a gas or gaseous mixture at a pressure greater than that in which the grain is steeped and under conditions favorable to an intimate commingling thereof, and thereafter passing the charged water upwardly through the mass of grain from the bottom to the top thereof.

5. The process of steeping grain which consists in forcing a gas or gaseous mixture into a closed chamber under pressure, spraying water through the body of compressed gas or gaseous mixture and delivering said water to a body of grain in the steep-tank and diffusing the same through the mass of said grain.

6. The process of steeping grain which consists in forcing a gas or gaseous mixture into a closed chamber under pressure, delivering water to said chamber in the form of spray, said spray passing through the body of gas or gaseous mixture in the chamber and striking the wall of the chamber and deflecting backwardly through said body of gas or gaseous mixture, and delivering said water to a steep-tank and diffusing the same throughout the mass of grain therein.

In testimony that I claim the foregoing as my invention I affix my signature, in presence of two witnesses, this 31st day of March, A. D. 1902.

WILLIAM P. RICE.

Witnesses:
WILLIAM L. HALL,
GERTRUDE BRYCE.